United States Patent Office 3,379,709
Patented Apr. 23, 1968

3,379,709
ORGANO-CHROMIUM COMPLEXES AND
THEIR PREPARATION
William G. Louden, Erwinna, Pa. 18920
No Drawing. Filed Mar. 18, 1963, Ser. No. 266,080
9 Claims. (Cl. 260—103)

ABSTRACT OF THE DISCLOSURE

A fused chromium-monocarboxylic organic acid coordination compound is reacted with an aliphatic alcohol having at least four carbon atoms, other than tertiary butyl alcohol, to provide a water insoluble organo-chromium complex.

The present invention relates to a method for producing organo-metal compositions, to the compositions produced thereby, and to high molecular weight organic substances modified by said compositions.

Coordination compounds of metals such as chromium and organic acids are well known in the art and are described, for example, in U.S. Patents Nos. 2,273,040, 2,356,161, 2,524,803 and 2,683,156 to Iler. While the precise structure of these compounds has not been fully elucidated, they are usually classed as Werner complexes. In general the ratio of carboxylic acid to metal atoms in such compounds is less than might theoretically have been considered possible, if the metal, e.g., chromium, is assumed to have a coordination number of six, and these complexes can therefore be considered "starved" in that the capacity of the metal to form coordinate bonds is not fully utilized.

The coordination compounds or complexes just described have been used in a variety of ways, for example, in adhesives and in waterproofing compositions. In some cases they have been employed in solutions of lower aliphatic alcohols, e.g., methanol or ethanol. However, in these instances it is clear that the alcohol is merely a vehicle and has no role in determining the properties of the complex.

It has now been discovered that novel metal-organo compositions can be made by mixing a solid metal-organic acid coordination compound with an alcohol having at least four carbon atoms at at least 80° C., and preferably at the boiling point (standard pressure) of the alcohol.

Although the exact structure of the novel compositions has not been precisely determined, it is clear that they represent something more than merely a solution of the metal-acid coordination compound in the alcohol since the properties of the alcohol-containing composition are quite different from those of the coordination compound. While I do not intend to be limited to any structural theory, I consider it likely that the alcohols fill, in whole or in part, the potential coordination "valences" of the previously "starved" complex, in effect creating a new complex.

The novel compositions can be used in a great variety of different applications. In general they are incorporated in various organic materials where they function to change the surface properties of the material. The way in which the novel complexes affect the surface properties of these materials can be controlled by the choice of alcohol used in the composition. Among other fields in which the novel compositions find employment there may be mentioned the preparation of adhesives and adhesive products, including self-adhesive labels and masking tape, the compounding of rubber for use in automobile tires and elsewhere, and the formulation of polyalkylene, e.g., polyethylene, products to make such products receptive to adhesives.

In one aspect the invention therefore comprises a method for making organo-metal compositions comprising mixing a complex or coordination compound of a metal selected from the group consisting of chromium, titanium, zirconium and vanadium and an organic acid, with an alcohol having at least four carbon atoms at a temperature of at least 80° C.

In its product aspects the invention includes a composition comprising a complex or coordination compound of the metals referred to with an organic acid, and an alcohol having at least 4 carbon atoms.

It has been found that the introduction of rosin into the compositions according to the invention gives particularly useful results. In some instances the rosin may be reacted directly with the metal component. In another variation the rosin may be added with the alcohol to a complex already formed from a metal component and an organic acid other than rosin. In the case of rosin compositions it is found that alcohols having 3 and more carbon atoms may be used to advantage.

The invention thus further includes a process for making metal-organo compositions which comprises forming a rosin containing organic acid coordination compound with a metal of the class referred to and mixing said coordination compound with an aliphatic alcohol having at least 3 carbon atoms at a temperature of at least 80° C.

From a product viewpoint, this aspect of the invention comprises compositions of a metal-organic acid complex including a rosin; and an aliphatic alcohol having at least 3 carbon atoms.

In yet another aspect the invention includes the process of modifying various organic materials of high molecular weight by incorporating in such materials the compositions described above, as well as the composite materials resulting from such incorporation.

The organo-metal composition

As noted above, in its simplest aspect the invention comprises compositions including an organic acid metal coordination compound and an aliphatic alcohol having at least 4 carbon atoms.

The metal-organic acid coordination compounds or complexes can be made in various ways known to the art. However, preferably they are made by fusing an organic acid (having at least 4 carbon atoms) with a metal salt. Indeed it is one of the advantages of the present invention that it makes the use of such fused coordination compounds practical. Coordination compounds made by fusion are inherently more desirable than those made by other methods because no extraneous reagents are introduced. However, fusion products have been thought to be of very limited solubility in most of the organic materials with which coordination compounds are normally used, presumably because in the fusion process a kind of polymerization seems to take place to create high molecular weight materials. For this reason the fusion products have not been widely used. With the present invention, on the other hand, a very large proportion of the fused compound is solubilized by the aliphatic alcohol and the resulting composition itself has a very high solubility in many organic materials; or can be made to have such solubility by a suitable choice of alcohol. Specifically it is found that when the alcohol has four or more carbon atoms there is a very significant increase in the amount of complex that can be dissolved and a change in the properties of the solution.

The metals which are suitable for use in the present invention include chromium, titanium, zirconium and vanadium. Of these chromium is preferred. The form in which the metal is used in making the metal-organo complex is not especially significant; however, preferably it is used as a salt or hydrated salt, the anionic component of which is capable of being volatilized when the salt is fused with a carboxylic acid. Nitrates, halides and particularly hydrated halides are especially useful. With chromium, for example, it is preferred to use hydrated chromic chloride $[Cr(H_2O)_6]Cl_3$. Alternatively, numerous salts containing chromium atoms capable of being converted to a valence state of three are readily available and can be used. For example, as disclosed in U.S. Patent 2,524,803 the hexavalent chromium atom in chromium trioxide can be converted to a valence state of three by reduction with an alcohol prior to formation of an organo chromium coordination compound. Other compunds such as hexavalent chromyl chloride can similarly be converted and after conversion used as a source of trivalent chromium ions.

Numerous monobasic aliphatic carboxylic acids having at least four carbon atoms can be used in preparing the organo chromium coordination compounds including:

(a) saturated straight chain acids, preferably having from 4 to 22 carbon atoms such as butyric, valeric, caproic, lauric, myristic, palmitic, stearic, arachidic and docosanoic acids;

(b) saturated branched chain acids such as isovaleric, α-octyl-caproic, β-ethyl-stearic and α-methyl caproic acid;

(c) unsaturated acids (including branched and straight chain acids) such as methacrylic, crotonic, sorbic, linoleic, geranic, oleic, palmitolic and eicosinic acid, and (d) aliphatic acids containing functional groups in addition to the carboxylic groups, for example, halogenated acids such as α-chloro valeric acid and β,β-dibromo caproic acid, hydroxy acids such as β-hydroxy pelargonic acid and amino acids such as α-amino undecanoic acid.

Acids such as stearic, docosanoic, n-valeric, n-octanoic, crotonic and methacrylic, iso-valeric, sorbic and linoleic acid are particularly preferred. It is understood that the aliphatic carboxylic acid may be used in the form of an anhydride, a salt or an ester as well as a free acid.

In making the metal-organic acid complex the specific procedure described in Iler 2,273,040 may be followed. Proceeding in this way the metal salt and the carboxylic acid are mixed in proportions such as to give a ratio of metal atoms to carboxylic acid groups of from say 1:4 to 10:1 and are then heated at temperatures sufficient to reduce the metal salt to a molten mass and to volatilize water and any acidic components (e.g. HCl) which may be released. Normally this will occur at temperatures over 100° C. and usually at say 120° C. to 250° C. The melt is kept at this temperature for say 20 minutes to 4 hours and provision is made to remove volatiles given off during the fusion. Thus, for example, if the chromium salt is chromium chloride hexahydrate $[Cr(H_2O)_6]Cl_3$, hydrogen chloride is evolved and removed. The final product, upon cooling, is a glassy, rock-like mass. This may then be reduced to powder or granular form by grinding or crushing by conventional means such as a ball mill or mortar and pestle.

After the metal-acid complex is formed, preferably as described above, and reduced to finely divided form, it is mixed with an alcohol having at least four carbon atoms.

The alcohols in which the organo-metal coordination compounds are dissolved can be straight chain aliphatic alcohols such as n-butanol, n-pentanol, n-hexanol and cetyl alcohol; branched chain aliphatic alcohols such as tertiary butanol, isoamyl alcohol, isooctanol, and 3-isopropyl-4-methyl-3-hexanol; and unsaturated alcohols such as 1-penten-3-ol, 4-penten-2-ol and 5-hexen-3-ol. Polyhydric aliphatic alcohols having more than four carbon atoms, such as glycols, pinacols and glycerols, i.e. trihydroxy aliphatic alcohols, can also be used.

In any case, the alcohol chosen is preferably a stable liquid at room temperature and will normally have a boiling point at atmospheric pressure of at least about 80° C.

There is really no upper limit to the boiling point of the alcohol. Normally the alcohols most useful will be those boiling below about 300° C.

The organo metal compositions are prepared by dissolving the organo metal coordination compound in the aliphatic alcohol at at least 80° C. and preferably at about the boiling point of the alcohol. Preferably, the compositions are prepared by refluxing the alcohol with the coordination compound at the boiling point of the alcohol for an extended period, say from ½ hour up to several, say 4 hours. The proportions on a parts by weight basis, of alcohol to coordination compound can range from about 1000:1 to about 0.1 to 1.0. Preferably the coordination compound is dissolved in the alcohol at atmospheric pressure; however, sub- and superatmospheric pressures can be employed. Agitation is preferably carried out during heating and although refluxing is the preferred means of agitating the mixture, other means such as stirring or bubbling gas through the solution are satisfactory.

It has been found that the metal-organo compositions of the invention have solubility characteristics significantly different from the solubility properties of similar compositions prepared by known techniques. Moreover, it has been discovered that the solubility properties of these metal-organo compositions are unexpectedly related to the particular alcohols selected for refluxing. By means of the present invention the various advantages of producing metal-organic acid coordination compounds by the fusion process may be obtained while the chief disadvantages, namely the insolubility of the fused product, is avoided. Moreover, since the solubility characteristics of the alcohol used have a pronounced effect upon the solubility characteristics of the composition, even though the organic acid remains the same, it is possible to provide compositions containing a particular metal-organic acid coordination compound having a wide range of solubility characteristics.

The unexpected solubility characteristics of the metal-organo compositions of the invention have not been observed except when the metal-organic acid coordination compound is combined with the alcohol at elevated temperature, usually approaching the boiling point of the alcohol, for a substantial period of time. This time will depend on the temperature but will normally be at least 15 minutes. For example, when samples of fused stearato chromic chloride are refluxed with an alcohol under atmospheric pressure for 1 hour the amount of coordination compound which is dissolved is about four times greater than if the complex is merely put into the hot alcohol. The solubility of the alcoholic compositions in various organic solvents is also different. Further it has been established that the particular alcohol employed in the compositions of the invention has a pronounced effect upon the adhesive properties that these compositions impart to certain materials.

The metal-organic acid-alcohol compositions of the invention are generally stable solutions at room temperature. They have little or no tendency to form sludges on storing. They can be added to a wide range of plastics, resins, natural and synthetic rubbers, natural and synthetic gums, paraffins, microcrystalline waxes and the like or solutions of these materials in organic solvents.

The novel process for preparing the organo chromium compositions and the properties of these compositions will be illustrated in the following Examples 1 to 8 which are to be considered illustrative only and not as limiting the scope of the invention.

In all examples in the specification, including Examples 1 to 8, fusing and refluxing are conducted at atmospheric pressure.

Example 1 illustrates the preparation of a fused organo chromium coordination compound comprising a trivalent chromium compound and an aliphatic acid.

Example 1

Chromic chloride hexahydrate (42.6 g.) is mixed with docosanoic acid (13.6 g.). The mixture is heated to a temperature fo 150° C. and maintained at this temperature for one hour. An air sweep is provided to remove volatile ingredients. The fused mass is allowed to cool to room temperature. A black, hard, rock-like mass, 46.8 g., identified as the coordination compound, docosanato chromic chloride, is produced.

In the following example fused docosanato chromic chloride from Example 1 is refluxed with various alcohols.

Example 2

A mixture of 20.4 g. of pulverized docosanato chromic chloride produced eaccording to Example 1 and 105 g. of tertiary butyl alcohol is refluxed for one hour at about 82.8° C. A second mixture comprising 20.1 g. of the complex and 105 g. of n-amyl alcohol is refluxed for one hour at about 138° C. This procedure, using approximately 20.1 g. of the complex and 105 g. of the alcohol, is repeated with seven other alcohols. In each case the mixture is refluxed at the boiling tempeatrure of the alcohol. The specific alcohols used are: methanol, ethanol, isopropanol, n-hexanol, stearyl alcohol, oleyl alcohol and 3-methyl-3-butyn-2-ol. In each case the complex remaining undissolved is filtered out, air dried and weighed. The results are as follows:

TABLE I

| Alcohol: | Percent of total solids remaining undissolved |
|---|---|
| Methanol | 40.9 |
| Ethanol | 32.7 |
| Isopropanol | 10.0 |
| Tert-butanol | 4.0 |
| n-Amyl alcohol | 8.7 |
| n-Hexanol | 5.0 |
| Stearyl alcohol | <5 |
| Oleyl alcohol | <5 |
| 3-methyl-3-butyn-2-ol | 70 |

It is evident from the foregoing that the solubility of fused coordination compounds such as docosanato chromic chloride after refluxing in various alcohols varies widely depending upon the particular alcohol employed.

It will also be observed that the ability of the alcohol to dissolve the coordination compound tends to increase with increasing chain length of the alcohol and that a sharp increase in the ability appears to occur with the four carbon alcohols.

The solubility in various solvents of docosanato chromic chloride, refluxed with n-amyl alcohol and with tertiary butyl alcohol, (at 138° C. and 82.8° C. respectively) is illustrated in the following example.

Example 3

A series of 1 cc. samples of a composition made by refluxing docosanato chromic chloride made as in Example 1 with n-amyl alcohol for one hour are mixed with 10 cc. of various solvents. This procedure is repeated using 1 cc. samples of a composition made by refluxing docosanato chromic chloride with tertiary butyl alcohol for one hour. After the samples have been allowed to stand at room temperature for 24 hours, they are inspected to determine whether there was any phase separation or other indication of insolubility. The results of these observations are tabulated below:

TABLE II

| Solvent | Tertbutanol control | Docosanato chromic Chloride in tert-butanol | n-Amyl alcohol control | Docosanato chromic chloride in n-amyl alcohol |
|---|---|---|---|---|
| White gasoline | | Insoluble | Soluble | Soluble. |
| Carbon tetrachloride | Insoluble | do | do | Do. |
| Petroluem ether | Soluble | do | do | Do. |
| Toluene | do | do | do | Do. |
| Isopropyl acetate | do | do | do | Do. |
| Isopropanol | do | Soluble | do | Do. |
| Water | Insoluble | do | Insoluble | Insoluble. |

It is apparent that the solubility of tertiary butanol in various solvents is appreciably affected by the presence of the coordination compound. Moreover, the solubility of fused docosanato chromic chloride refluxed in n-amyl alcohol differs significantly from that of docosanato chromic chloride refluxed in tertiary butanol. This is surprising since in prior instances where organic acid chrome complexes were dissolved in alcohols, the nature of the alcohol was found to have little effect on the properties of the solution.

In the following example, a solution of docosanato chromic chloride in n-butanol is prepared according to the method described in U.S. Patent 2,524,803 to Iler, a method which does not involve fusion. This material is compared with a fused docosanato chromic chloride compound which has been refluxed with n-butanol according to the present invention.

Example 4

Ten grams of chromium trioxide crystals are dissolved in 19.2 g. of 37% aqueous hydrochloric acid. After the chromium trioxide is dissolved, the solution is slowly added, dropwise, to 81.5 g. of n-butanol, with occasional chilling to control the exothermic reaction. Docosanoic acid (17.0 g.) is added and the mixture refluxed for 30 minutes. After standing at room temperature for 24 hours, an insoluble green oil, dodosanato chromic chloride, is noted on the bottom of the reaction vessel. Thus the n-butanol layer is saturated with docosanato chromic chloride.

A 20.4 g. sample of docosanato chromium chloride prepared according to the procedure of Example 1 is then refluxed with 105 g. of n-butanol for 1 hour at about 118° C. according to the procedure of Example 2. 19.1 g. of the complex are dissolved.

The solubility of the two butanol solutions in various common organic solvents is now compared by adding 1 cc. samples of each of the solutions to 20 cc. portions of the solvents and allowing the resulting mixtures to stand in sealed test tubes for 24 hours. The results are tabulated below:

TABLE III

| Solvent | Dososanato Chromic Chloride prepared in n-butanol (Iler process) | Fused Docosanato Chromium Chloride refluxed in n-butanol |
|---|---|---|
| Carbon tetrachloride | Insoluble | Soluble. |
| Petroleum ether | do | Do. |
| Toluene | do | Do. |
| Isopropyl acetate | do | Do. |
| Isopropanol | S. soluble | Do. |
| Water | Insoluble | Insoluble. |
| Hexane | do | Soluble. |

The adhesion properties of the compositions described in Example 4 are illustrated in the following example.

Example 5

The n-butanol solutions prepared in Example 4, i.e., the n-butanol solution of docosanoic chromic chloride prepared by the process of Iler 2,524,803 and the solution prepared in accordance with the claimed process are applied to parchment. Specifically 2 percent isopropanol solutions of each of the n-butanol solutions are prepared and super calendared brown vegetable parchment is dipped in the solutions, and dried for 2 minutes at 104° C. A one inch wide strip of pressure sensitive adhesive tape (Minnesota Mining and Mfg. Co. No. 202) is then applied under a pressure of 400 p.s.i. for 2 minutes at room temperature. The stripping force at 180° peelback is then measured in a standard tensile tester. The results are tabulated below:

TABLE IV

| Composition in Isopropanol | Initial Adhesion in grams/inch | Adhesion after 7 days at 66° C. in g./inch |
|---|---|---|
| Fused Docosanato Chromic Chloride prepared by fusion process and refluxed in n butanol | 332 | 405 |
| Docosanato Chromic Chloride prepared in n-butanol according to the Iler process | 232 | 312 |

From the foregoing it is evident that docosanato chromic chloride-n-butanol prepared by the two different techniques has different solubility and releasing properties.

In the following example, various fused organo-chromium coordination compounds are prepared and subsequently refluxed in certain alcohols. The solubility characteristics of these materials are then observed.

Example 6

Four different organo-chromium coordination compounds are produced according to the method described in Example 1 by fusing: (i) 11.4 g. of n-valeric acid and 21.3 g. of chromic chloride hexahydrate, (ii) 11.4 g. of isovaleric acid and 21.3 g. of chromic chloride hexahydrate, (iii) 12.4 g. of sorbic acid and 21.3 g. of chromic chloride hexahydrate, and (iv) 33.6 g. of linoleic acid and 42.6 g. of chromic chloride hexahydrate. Two samples (each 20 g.) of each of compounds (i), (ii), and (iii) are then refluxed for one hour with 100 g. of tertiary butanol and n-pentanol at the boiling points of the respective alcohols, using the technique of Example 2. Similarly a 28 g. sample of product (iv) is refluxed for one hour with isooctyl alcohol.

To determine the solubility characteristics of the resulting liquids, 1 cc. samples of each are mixed with 20 cc. samples of various solvents and allowed to stand in corked test tubes for 24 hours.

The results are tabulated below.

Example 7

Samples of the organo chromium compositions whose preparation is described in Example 2, comprising docosanato chromic chloride dissolved in various alcohols are further diluted to a 2% solids content with various solvents. Unbleached vegetable parchment is then dipped in the diluted solutions, dried and tested for adhesion. Two series of tests were made. In one commercial adhesive tape (Minnesota Mining and Manufacturing No. 202) is applied at 400 p.s.i. and room temperature for two minutes and then immediately stripped off. In another, the tape is allowed to remain for 7 days at 150° F. and then stripped. The results are tabulated below:

TABLE VI

| Composition tested: Docosanato Chromic Chloride and | Diluted with— | Initial Stripping Force (g/in.) | Stripping Force (g/in.) after 7 days at 66° C. |
|---|---|---|---|
| Isopropanol | Water | 975 | 1,050 |
| Tertiary Butanol | do | 250 | 312 |
| Isopropanol | Isopropanol | 375 | 385 |
| Tertiary Butanol | do | 225 | 262 |
| n-Amyl alcohol | Pet. ether | 362 | 375 |
| n-Hexanol | do | 600 | 762 |
| Stearyl alcohol | Isopropanol | 650 | 767 |
| Oleyl alcohol | do | [1] 175 | 837 |
| 3-methyl-3-butyn-2-ol | do | [1] 312 | 637 |
|  |  | [1] 250 | 425 |

[1] Gross transfer of treatment to adhesive mass was noted.

Metal-organic compositions containing rosin

As noted above, the invention comprises compositions which contain rosin. These are of two types. In one rosin is used alone as the organic acid in the organic acid-metal coordination compound. Alternatively, a metal-organic acid coordination compound formed without rosin can be heated with rosin and an alcohol.

Rosin containing compositions according to the invention are of particular use in modifying the adhesive characteristics of various organic polymers, in particular rubbers. It has, of course, been known to use rosin itself to improve the adhesiveness of rubber. Compositions according to the invention are, however, effective in much smaller quantities than rosin itself. Moreover, a large variety of effects can be obtained using the present compositions by a suitable choice of alcohol. Many of such effects cannot be obtained using rosin itself.

In preparing the rosin containing compositions according to the invention, the general procedures outlined above are followed. That is to say, a metal-organic acid complex is first prepared, preferably by fusion. In preparing the complex a salt of the metal to be used is fused with an organic acid in proportions of metal atoms to carboxylic acid groups ranging from say 1:6 to 10:1. If rosin is used in the fusion, it can be considered to be abietic acid, for purposes of computing the proportions. As in the species of the invention disclosed earlier, the metal used may be titanium, zirconium, chromium or vanadium, with chromium preferred. The metal is used, as before, in the form of a salt, preferably containing a

TABLE V

| Fused Coordination Compound | Refluxing Alcohol | Percent Insolubles Present [1] | Carbon Tetrachloride | Petroleum Ether | Toluene | Isopropyl Acetate | Isopropanol | Water | Hexane |
|---|---|---|---|---|---|---|---|---|---|
| Valerato Chromic Chloride | Tertiary butanol | 2.14 | Soluble | Insoluble | Soluble | Soluble | Soluble | Soluble | Insoluble |
| Do | n-Amyl alcohol | [2] | do | Soluble | do | do | do | Insoluble | Soluble |
| Isovalerato Chromic Chloride | Tert-butanol | [2] | do | Insoluble | Slightly soluble | do | do | Soluble | Insoluble |
| Do | n-Amyl alcohol | [2] | do | Soluble | Soluble | do | do | Insoluble | Soluble |
| Sorbato Chromic Chloride | Tert-butanol | 25.5 | Insoluble | Insoluble | Slightly soluble | do | do | do | Insoluble |
| Do | n-Amyl alcohol | 7.7 | Soluble | Soluble | Soluble | do | do | do | Soluble |
| Linoleato Chromic Chloride | Iso-octyl alcohol | 23.4 | do | do | do | do | do | do | Do |

[1] After refluxing. [2] Negligible.

volatilizable anion, such as chromium chloride hydrate.

The organic acid used may be rosin itself or a mixture of rosin and an organic acid, preferably, but not necessarily, an organic acid having at least four carbon atoms. Any of the various types of rosin generally available may be used, for example, gum rosin derived from crude teurpentine, oleoresin, wood rosin and tall oil rosin. These are normally considered to consist chiefly of resin acids of the abietic and pimaric type.

The organic acid used may include any of those previously referred to in connection with the simple acid-metal coordination compounds referred to earlier in this specification. Similarly, the detailed procedure used in preparing the coordination compound is the same as that described earlier, whether or not rosin is used in the organic acid component.

Following preparation of the acid-metal coordination compound, that compound is ground to powdered or granular form and then heated with an alcohol having at least three carbon atoms in the molecule or, if no rosin has been used in making the coordination compound, with both an alcohol having at least three carbon atoms and with rosin. It will be understood, of course, that even if rosin has been used in preparing the coordination compound, it may still be used with the alcohol in the subsequent stage.

In yet another procedure, where rosin is used, a metal salt such as chromium chloride hexahydrate may be fused, by itself, to remove water of hydration and then refluxed with a mixture of alcohol and rosin at the boiling point of the mixture.

Generally at least one part by weight, and normally between about one and about 20 parts by weight of alcohol are added per part of complex, assuming that rosin is present in the complex and none is to be added with the alcohol. If this is not the case, i.e. if rosin is to be added with the alcohol, between about one and about 20 parts of alcohol and between about 0.1 and about 2 parts of rosin are added, per part of complex.

The manipulative techniques involved in dissolving the complex in the alcohol are very simple. The coordination compound is normally first dissolved in the alcohol and the rosin is added. However, the rosin may, if desired, first be dissolved in the alcohol and the complex then added to the solution. The alcohol must be at a temperature of at least 80° C. It is preferably at the boiling point and is maintained at the boiling point, or above, during the dissolution of the rosin and/or coordination compound. The coordination compound is preferably kept in contact with the alcohol or alcohol-rosin solution, at the boiling point, and preferably with agitation, for an extended time of at least fifteen minutes and often up to several, say 1 or 2 hours. Conveniently, as in the case of the simple alcohol-complex compositions described earlier, the process is carried out by refluxing the coordination compound with alcohol or rosin-alcohol mixture.

In one variation of the invention, a particularly useful series of compositions can be formulated by adding to the metal-rosin-alcohol or metal-acid-rosin-alcohol compositions a liquid paraffin or substituted paraffin solvent. Examples of such solvents include pentane, hexane, heptane, trichloroethane and 1,1-dichloro-ethane. This can be done conveniently by adding from say 1 to 100 parts by weight of the solvent, based on the weight of the basic coordination compound, to the alcohol or alcohol-rosin mixture, after the alcohol or alcohol mixture has been substantially saturated with complex and continuing the heating at the boiling point of the paraffin diluted mixture for several minutes, say 10 minutes to 60 minutes.

As indicated earlier, the rosin containing compositions just described are soluble in a wide range of high molecular weight organic compounds. The solubility characteristics of any particular composition is related to the alcohol which it contains. It must be emphasized, however, that these unique characteristics are not obtained unless the rosin metal or rosin-acid-metal combinations are heated with the alcohol for a more or less extended time, in accordance with the invention.

The rosin containing compositions, their properties and preparations are described in the following examples.

Example 8

Chromium chloride-hexahydrate (42.6 g.) is mixed with docosanoic acid (13.6 g.) and the mixture heated until the temperature reaches 180° C. A continuous air sweep is provided to remove volatiles. The mass is held at 180° C. for one hour. The resulting solid mass (approximately 42 g.) is ground to a powder and 20 g. of wood rosin and 20 g. of isopropanol are added. The mixture is refluxed for 30 minutes. Hexane (175 g.) is then added and refluxing continued for another 30 minutes. At the end of this time the solution is allowed to cool overnight. It is then filtered to remove 13.7 g. of solids. The filtrate contains 19.7% solids.

Example 9

For comparison, the foregoing example (Example 8) is repeated (a) using ethanol in place of isopropanol and (b) omitting the alcohol entirely. Using ethanol, 24.6 g. of solids remain undissolved. Using no alcohol, 22.6 g. of the solids remain undissolved.

Example 10

The procedure of Example 9 is repeated using tall oil rosin in place of wood rosin. The undissolved solids amount to 17.4 g.

Example 11

Chromium chloride hexahydrate (42.6 g.) is mixed with octanoic acid (23.0 g.) and the mixture is heated until the temperature reaches 140° C. The fused mass is held at 140° C. for one hour, at which time its mass has decreased to 45.5 g. The coordination compound is then ground to a powder and 20 g. each of wood rosin and isopropanol are added. The mixture is refluxed for 30 minutes. Hexane (170 g.) is then added and refluxing continued for another 30 minutes. The solution is allowed to stand overnight and then filtered. Insolubles amount to 7.2 g. The solution contains 23.4% solids.

Example 12

The procedure of Example 11 is repeated substituting isopropanol for hexane. No insolubles are left and the solution contains about 25% solids.

Example 13

The procedure of Example 11 is repeated substituting n-hexanol for both the isopropanol and the hexane. Again no insolubles are left and the filtrate contains about 25% solids.

Example 14

Chromic chloride hexahydrate (42.6 g.) is mixed with 33.6 g. of linoleic acid and the temperature of the mass is raised to 150° C. The mass is held at this temperature for one hour after which 62.5 g. of solids remain. This is ground up and 20 g. each of gum rosin and isooctyl alcohol added. The mixture is refluxed for 30 minutes. Hexane (170 g.) is then added and the mixture refluxed for another 30 minutes. The solution is cooled overnight and filtered. Insolubles amount to 19.3 g. The solution contains about 25% solids.

Example 15

Chromium chloride hexahydrate (21.3 g.) is heated at 150° C. for one hour. An air sweep is provided to remove volatiles. The weight after fusion is 15.3 g. To the fused material is added 10 g. gum rosin and 10 g. of isopropanol and the mixture is refluxed for 30 minutes. Hexane (85 g.) is then added and refluxing resumed for another 30 minutes. The solution is allowed to cool overnight. The weight of insolubles is 32.9 g.

The foregoing example illustrates the fact that the alcohol in the present compositions enters into a combination with the metal and rosin, since in this experiment the weight of insolubles cannot be accounted for solely on the basis of the formation of a chrome-rosin complex.

When this experiment is repeated, using n-butanol instead of isopropanol, only 9.8 g. of insolubles are obtained. This illustrates the effect of changing the type of alcohol, in addition to rosin, in the composition.

Example 16

Chromic chloride hexahydrate (21.3 g.) is heated to 150° C. and held at that temperature under an air sweep for one hour. The weight after fusion is 15.3 g. To this is added 10 g. gum rosin and 10 g. isopropanol and the mixture is refluxed for 30 minutes. An additional 100 g. isopropanol is then added and refluxing continued for 30 minutes. The solution is cooled overnight and then filtered. Insolubles amount to 0.7 g.

Example 17

The procedure of Example 16 is repeated substituting n-butanol for isopropanol. Insolubles are found to be 9.8 g.

Example 18

Chromic chloride hexahydrate (21.3 g.) is mixed with sorbic acid (12.4 g.), the mixture is heated to 130° C. and held at that temperature, under an air sweep, for one hour. At the end of this period, 10 g. of gum rosin and 10 g. of isopropanol are added and refluxing continued for 30 minutes. N-amyl alcohol (85 g.) is added and refluxing continued for 30 minutes. The insolubles amount to 4.3 g. The solution contains 23.5% solids.

Example 19

Chromium chloride hexahydrate (21.3 g.) is mixed with 6 grams of crotonic acid, heated to 130° C. and maintained at that temperature for one hour. Gum rosin (10 g.) and isopropanol (10 g.) are then added and refluxing carried out for 30 minutes. Isoamyl alcohol (85 g.) is then added and the mixture refluxed for another 30 minutes. The amount of insolubles is negligible.

Example 20

The compound 12-hydroxy stearic acid (11.4 g.) is mixed with 21.3 g. $Cr(H_2O)_6Cl_3$, heated to 140° C. and maintained at that temperature under an air sweep for one hour. Gum rosin (10 g.) and isopropanol (10 g.) are then added, and the mixture refluxed for 30 minutes. Hexane (85 g.) is added and refluxing continued for 30 minutes. Insolubles are about 10 g. The solution contains 21% solids.

Example 21

Chromium chloride hexahydrate (21.3 g.) is mixed with 11.4 g. of normal valeric acid. The temperature of the mass is raised to 120° C., and the mass is held at 120–130° C. for one hour under an air sweep. Gum rosin (10 g.) and isopropanol (10 g.) are added and refluxed for 30 minutes. Hexane (85 g.) is then added and refluxing resumed for 30 minutes. There are no insolubles. Solids content of the solution is 20.5%.

Example 22

Chromium chloride hexahydrate (21.3 g.) is mixed with 11.4 g. of isovaleric acid and the temperature of the mass is raised to 130° C. An air sweep is provided to remove volatile ingredients. The mass is held at 130° C. for one hour. Gum rosin (10 g.) and isopropanol (10 g.) are added and refluxed for 30 minutes. Hexane (85 g.) is then added and refluxing resumed for another 30 minutes. There are no insolubles. Solids content is 24.8%.

Example 23

Chromium chloride hexahydrate (21.3 g.) is mixed with 13.5 g. of isodecanoic acid and the temperature of the mass raised to 130° C. An air sweep is provided to remove volatile ingredients. The mass is held at 130° C. for one hour after which gum rosin (10 g.) and isopropanol (10 g.) are added. The mixture is refluxed for 30 minutes, following which hexane (85 g.) is added and refluxing continued for another 30 minutes. Insolubles are 10.5 g.

Example 24

Wood rosin (10 g.) is mixed with 6.8 g. of amino acetic acid and fused at 120° C. for 10 minutes. A yield of 16 g. of fused rosin/amino acetic acid is obtained. Chromic chloride hexahydrate (21.3 g.) is added to the fused mass and fusion continued at 120–130° C. for 25 minutes. A yield of 30.1 grams of the chrome/rosin/amino acetic complex is observed. Isopropanol (105 g.) is added to the complex and the mixture is refluxed for one hour. The insolubles are negligible.

Example 25

The procedure of Example 24 is repeated substituting n-butanol for isopropanol. Insolubles amount to 22 g.

Example 26

Wood rosin (10 g.) is mixed with 10 grams of 2-amino octanoic acid and fused for 10 minutes at 120° C. A yield of 16.7 grams is obtained. Chromic chloride hexahydrate (21.3 g.) is added to the fused mass and fusion resumed at 120–130° C. for one hour. A yield of 34.8 g. is obtained. Normal butanol (85 g.) is added and the mixture refluxed for one hour. The insolubles are negligible.

High molecular weight-organic materials containing the metal-organic compositions It has already been observed that the metal-organic acid-alcohol compositions, with or without rosin, whose preparation has just been described, may be used to great advantage to vary the surface properties of various organic materials. It has, for example, been observed that the adhesion of rubber solutions to various substances can be changed by incorporating relatively small amounts of the novel composition in the rubber. The effect is highly specific to the particular metal-acid complex and to the alcohol. Thus the use of one alcohol may increase the degree of adhesion of say a rubber adhesive to a given surface while the use of another alcohol may decrease the adhesiveness, all other components of the system remaining the same.

Again, by compounding the novel compositions into solid articles, e.g. of rubber, polyvinyl chloride, polyvinylidene chloride, polyethylene and polypropylene, the adhesiveness of such objects to each other and to various conventional adhesives can be controlled.

The high molecular weight organic materials with which the present compositions are useful may include virtually any organic material having a molecular weight over say 10,000. Polymers of all types may be treated, particular elastomeric substances, and the roll of possible materials includes rubbers of all types, both natural and synthetic, synthetic resins including polyvinyl chloride, polyvinyl acetate, acrylic polymers such as polymethyl methacrylate, polyacrylonitrile, polystyrene, polyalkylenes such as polyethylene and polypropylene, cellulose, cellulose derivatives such as nitrocellulose and cellulose acetate, silicones, and waxes.

The mechanism by which the organo-metal compositions operate on the surface characteristics of high molecular weight organic materials is not known. However, it is theorized that the compositions have a head and tail structure in which the head and tail have markedly different properties. Depending on the nature of the material into which the novel composition is incorporated, either the head or the tail will appear on the surface, thus affecting the surface properties.

The amount of the novel composition which is incorporated in the high molecular weight organic material may vary widely depending on the composition, the nature of the high molecular weight material and the effect desired. In general it can be said that appreciable effects can be observed with as little as ¼% of the composition (based on the weight of the material to which the composition is added). In general, not more than say 10% of the composition will be added, again based on the weight of high molecular weight material.

The technique used to add the novel compositions to the high molecular weight material will vary greatly. One convenient technique has been to dilute the composition to a rather low concentration of solids (say 2% solids) with a solvent which will be taken up by the material and then add this solution to the material. Other convenient techniques may be used.

This aspect of the invention will be further described with reference to the following specific examples:

Example 27

The following polymer solutions are made up:

(a) a solution of 10.6% prime natural rubber in toluene;

(b) a solution of 25.7% polyisobutylene (Enjay Butyl 268) in toluene;

(c) a 20% solution of a hot process styrenebutadiene polymer (Plioflex 1006) in toluene;

(d) a 22.5% solution of a cold process styrenebutadiene (Plioflex 1507) in toluene;

(e) a 20% solution of a butadiene-acrylobutrile rubber prepared by the cold process (Chemigum N–600) in toluene;

(f) a 25.7% solution of polychloroprene (Neoprene WRT) in toluene;

(g) a 25% solution of polyvinyl methyl ether in toluene;

(h) a solution of 45 g. of polyisoprene (Shell 305) in 405 g. toluene;

(i) 60 g. "cis-4" polybutadiene in 240 g. toluene.

To solution (b) a sufficient quantity of various metal-organo compositions is added to give 2% metal-organo solids on polymer solids. Super calendared 40 pound 24" x 36" unbleached vegetable parchment is coated with the test solution, using an iron bar to make the drawdowns. The sheets are air dried at room temperature for 24 hours, weighed and tested.

In a first series of tests a 1" wide strip of the coated parchment is laid on a piece of uncoated parchment and a piece of cardboard the same size is laid on top. A pressure of 400 p.s.i. is then applied at room temperature for two minutes. The stripping force required to separate the two surfaces in a 180° peelback is measured in a tensile tester.

In a second test procedure two coated strips of the same size (1" wide) are laid face to face with the coated surfaces in contact. Light finger pressure, just enough to bring the surfaces into contact, is applied and the stripping force at 180° peelback is determined within 2 minutes.

The metal organo solutions used in this series of tests are:

(A) Docosanato-chromic chloride-n amyl alcohol prepared in accordance with Example 2.

(B) Docosanato-chromic chloride-ethanol prepared in accordance with Example 2.

(C) Docosanato-chromic chloride-stearyl alcohol prepared according to Example 2.

(D) Docosanato-chromic chloride-oleyl alcohol prepared according to Example 2.

(E) Docosanato-chromic chloride-2-methyl-3-butyn-2-ol prepared according to Example 2.

(F) Sorbato-chromic chloride-n-pentanol prepared according to Example 6.

(G) Sorbato-chromic chloride-terbutanol prepared according to Example 6.

(H) Valerato-chromic chloride-n-pentanol prepared according to Example 6.

(I) Valerato-chromic chloride-terbutanol prepared according to Example 6.

(J) Isovalerato-chromic chloride-n-pentanol prepared according to Example 6.

(K) Isovalerato-chromic chloride-terbutanol prepared according to Example 6.

The results of the tests are tabulated in Table VII below:

TABLE VII

| Metal-Organo Composition | | Coating Wt., lbs./ream | Stripping Force (g.) | |
|---|---|---|---|---|
| Composition | Wt. percent added | | On Parchment | Self Adhesion |
| None | | 12 | 159 | 491 |
| A | 12.9 | 11 | 327 | 362 |
| B | 17.9 | 14 | 329 | 318 |
| None | | 32 | 325 | 350 |
| C | 13.1 | 36 | 150 | 50 |
| D | 14.2 | 33 | 50 | 60 |
| E | 37.8 | 44 | 425 | 250 |
| F | 11.2 | 35 | 400 | 75 |
| G | 16.8 | 33 | 160 | 60 |
| H | 12.4 | 32 | 744 | 391 |
| I | 15.9 | 30 | 585 | 275 |
| J | 10.0 | 29 | 200 | 150 |
| K | 12.5 | 27 | 415 | 715 |

The procedure just described is then repeated with various polymer solutions other than polyisobutylene (solution (b)). In each case the proportion of metal-organo composition added is such as to give 2% metal-organo solids on polymer solids. The results are tabulated in Table VIII below.

TABLE VIII

| Polymer | Organic-Metal Composition | | Coating weight lbs./ream | Stripping Force (g.) | |
|---|---|---|---|---|---|
| | Composition | Wt. Percent | | On Parchment | Self Adh. |
| a | None | | 7 | | 102 |
| a | A | 12.9 | 5 | | 87 |
| a | B | 17.9 | 4 | | 164 |
| c | None | | 6 | 207 | 155 |
| c | A | 12.9 | 9 | 36 | 27 |
| c | B | 17.9 | 14 | 42 | 28 |
| d | None | | 12 | 585 | 533 |
| d | A | 12.9 | 11 | 135 | 44 |
| d | B | 17.9 | 11 | 198 | 88 |
| e | None | | 9 | 655 | 1290 |
| e | A | 12.9 | 12 | 52 | 62 |
| e | B | 17.9 | 15 | 82 | 183 |
| f | None | | 6 | 840 | 1030 |
| f | A | 12.9 | 8 | 570 | 1330 |
| f | B | 17.9 | 4 | 206 | 331 |
| g | None | | 2 | 12 | 129 |
| g | A | 12.9 | 2 | 38 | 188 |
| g | B | 17.9 | 3 | 12 | 225 |
| h | None | | 5 | 0 | 30 |
| h | A | 12.9 | 2 | 0 | 0 |
| i | None | | 11 | 35 | 580 |
| i | A | 12.9 | 8 | 50 | 30 |

Example 28

Sufficient docosanato-chromic chloride-n-pentanol and ethanol solutions (solutions A and B) are added to a 25% dimethylpolysiloxane (Dow-Corning 271)-toluene solution to give 2% metal-organo solids in polymer solids. Parchment is coated as in Example 27. To determine stripping force on parchment a one inch wide strip of the coated parchment is laid on uncoated parchment and light pressure, only enough to secure contact is applied along with heat (104° C. for 2 minutes). The assembly is cooled to room temperature and stripping force is measured at 180° peelback. A similar procedure is used to determine self adhesion except that two coated sheets are used. Results are tabulated in Table IX below.

TABLE IX

| Metal Organo Composition | | Coating weight, lbs./ream | Stripping Force (g.) | |
|---|---|---|---|---|
| Composition | Wt. Percent added | | On Parchment | Self Adhesion |
| None | | 2 | 25 | 270 |
| A | 12.9 | 2 | 37 | 200 |
| B | 17.9 | 2 | 30 | 224 |

Example 29

Metal organo solution A, identified above in Example 27, is added to various polymer solutions in proportions such as to give 2% of metal-organo solids on the weight of polymer solids. The solutions are coated on smooth, super-calendered unbleached vegetable parchment (Paterson Parchment Paper Company Durapak 40–73S) and allowed to air dry at room temperature for 24 hours. The polymer solutions used are as follows:

(j) 90 g. poly-n-butyl methacrylate (Lucite 44) dissolved in 270 g. toluene.

(k) 100 g. polystyrene (Lustrex HF–11) in 270 g. toluene.

(l) 50 g. cellulose acetate butyrate (Eastman EAB 500–5) in 270 g. isopropyl acetate.

(m) 105 g. cellulose acetate (Eastman E 398–3) in 215 g. acetone.

(n) 265 g. nitrocellulose (Hercules ½ sec.) in 225 g. acetone.

In testing these samples, strips 1″ wide and 5″ long are cut, dampened with the solvent used to dissolve the polymer and applied to uncoated or coated parchment. Light pressure is then applied and the samples are heated at 104° C. for 2 minutes. Stripping tests are run on cool samples as before. The results are tabulated in Table X below.

TABLE X

| Metal-Organo Composition | | | Coating weight, lbs./ream | Stripping Force (g.) | |
|---|---|---|---|---|---|
| Polymer | Composition | Wt. percent added | | On Parchment | Self Adhesion |
| j | None | | 18 | 477 | 900 |
| j | A | 12.9 | 21 | 69 | 69 |
| k | None | | 5 | 87 | 73 |
| k | A | 12.9 | 6 | 30 | 25 |
| l | None | | 12 | 120 | 84 |
| l | A | 12.9 | 11 | 55 | 11 |
| m | None | | 15 | ¹ 95 | 250 |
| m | A | 12.9 | 9 | ¹ 75 | 100 |
| n | None | | 39 | ¹ Tears | ¹ Tears |
| n | A | 12.9 | 33 | 160 | 133 |

¹ On super-calendared Kraft paper.

Example 30

A study is conducted to ascertain the effect of direct addition of certain metal-organo compositions in suitable solvents to various types of pressure sensitive adhesives. The procedure is to weigh out 50 g. of the adhesive under test and to this adhesive add sufficient metal-organo composition in solution to equal 2 percent metal-organo solids on dry adhesive solids. The adhesive mixtures are coated onto unbleached super-calendared vegetable parchment and allowed to air dry at room temperature for 24 hours. The amount of adhesive coating weight is determined by weighing the coated sheet and comparing with the weight of an uncoated sheet of the same size.

In a first test procedure a one inch wide strip of coated parchment five inches long is laid on a sheet of super-calendared vegetable parchment and light finger pressure applied, just enough to insure contact between the surfaces. Within two minutes the stripping force required to separate the two surfaces in an 180 degree peelback test is measured in the tensile tester.

In a second test procedure, two coated surfaces are brought into contact with light finger pressure. The stripping force on 180 degree peelback is determined within two minutes.

Testing temperature for both series is 24° C.

Results are secured for both the plain adhesive and for the same adhesive with 2% complex solids on adhesive solids added and the relative stripping force for the metal-organo containing adhesives is reported as percent of the force for the plain adhesive.

The adhesives used are Rubber and Asbestos Corporation's p561, described as a synthetic rubber-resin type, Rubber and Asbestos P538, a pigmented natural rubber type, and Rubber and Asbestos P578, described as a synthetic resin type.

The metal-organo solutions used are in some cases those identified in Example 27 above. However, there are also used the following solutions:

(L) A solution of linoleato-chromic chloride-isooctanol prepared as described in Example 6.

(M) A solution of 10-undecanato chromic chloride-isooctanol prepared by fusing 21.3 g. of chromic chloride hexahydrate with 9.2 g. 10-undecanoic acid for 1 hour at 150° C. and refluxing the resulting solid for one hour with 105 g. of isooctanol. The cooled, filtered solution contains 15% solids.

(N) A solution of octanato-chromic chloride-isooctanol prepared by fusing 21.3 g. of chromic chloride hexahydrate with 11.5 g. of N-octanoic acid for 1 hour at 150° C. and refluxing the product with 105 g. of isooctanol for one hour. The cooled, filtered solution contains 16% solids.

The results obtained are given in Table XI below:

TABLE XI

| Metal-organo Composition | Adhesive | Relative Stripping Force (percent) | |
|---|---|---|---|
| | | On Parchment | Self Adhesion |
| B | R & A p561 | 60 | 29 |
| A | R & A p561 | 17 | 111 |
| L | R & A p561 | 76 | 89 |
| M | R & A p561 | 78 | 105 |
| N | R & A p561 | 63 | 83 |
| B | R & A p578 | 111 | 110 |
| A | R & A p578 | 157 | 171 |
| L | R & A p578 | 105 | 145 |
| M | R & A p578 | 115 | 165 |
| N | R & A p578 | 67 | 147 |
| B | R & A p538 | 79 | 111 |
| A | R & A p538 | 159 | 91 |
| L | R & A p538 | 23 | 65 |
| M | R & A p538 | 91 | 70 |
| N | R & A p538 | 23 | 51 |

In these experiments the proportions of compositions B, A, L/M and N added to the adhesive are 17.9%, 12.9%, 12.9%, 12.9% and 12.4%, respectively.

These data clearly shown that addition of alcohol modified complexes of docosanato chromic chloride, octanato chromic chloride, linoleato chromic chloride, and 10-undecanato chromic chloride influence the self-adhesion characteristics and the bond to cellulose of three well-known types of pressure sensitive adhesives. The data shows that the type of alcohol has an effect on the results observed.

Example 31

The effect of the docosanato-chromic chloride-rosin-isopropanol-hexane and octanato-chromic chloride-rosin-isopropanol-hexane solutions made in Examples 8 and 11 and a linoleato-rosin-pentanol-hexane solution prepared in a similar manner, on the adhesive qualities of butyl and butadiene-styrene rubber solutions is investigated. The metal-organo solutions are identified below as O, P, and Q respectively.

Solutions are made up by dissolving 90 g. of butyl rubber (Enjay 268) and 60 g. of styrene-butadiene rubber (Ameripol 1500) in 260 and 210 g. of toluene, respectively. To portions of each of these solutions small quantities of the metal-organo solutions are then added, the amount being sufficient to give 2% organo-metal solids on rubber solids.

In a first series of tests, the solutions are coated onto smooth, super-calendared, unbleached vegetable parchment (Paterson Parchment Paper Company Durapak 40–

73s) and allowed to air dry at room temperature for 24 hours. Strips 1" x 5" are cut and pressed on the same uncoated paper with a pressure of 40 p.s.i. for two minutes at room temperature. The strip is then peeled in a tensile tester with 180° rollback.

In a second "self adhesion" series, two coated 1" x 5" strips are laid face to face using light finger pressure and immediately stripped in the tensile tester using 180° rollback.

The results of these tests are tabulated in Table XII below.

Example 34

A series of experiments is run testing the effect of adding solutions O, R, and Q of Example 31 to various polymeric solutions. In certain cases, the polymeric solutions are those described in Examples 27 and 29 above; in other instances the following solutions were added:

(o) 234 g. dimethylpolysiloxane (Dow Corning 271) in 117 g. toluene.

(p) 150 g. polyvinylacetate solution (Elvacet 60-05) in 210 g. methanol.

TABLE XII

| Rubber | Metal-Organo Composition | | Lbs. of coating per ream | Stripping Force (g.) | |
|---|---|---|---|---|---|
| | Composition | Wt. Percent added | | Uncoated Parchment | Self-Adhesive |
| Butyl | None | | 12 | 160 | 490 |
| Do | O | 8.6 | 13 | 442 | 390 |
| Do | P | 10.2 | 15 | 388 | 640 |
| Do | Q | 8.0 | 15 | 405 | 510 |
| Styrene-Butadiene (SB) | None | | 4 | 42 | 110 |
| SB | O | 8.6 | 7 | 1,200 | 1,600 |
| SB | P | 10.2 | 8 | 1,120 | 1,820 |
| SB | Q | 8.0 | 10 | 1,310 | 2,080 |

Example 32

The coated strips of Example 31 are applied to various surfaces and the stripping force measured. Results are tabulated below (Table XIII):

Solutions O, P and Q are added to each of these polymer solutions in proportions of 8.6%, 10.2% and 8.0%, respectively. The resulting combined solutions are then applied to unbleached super-calendared parchment as de-

TABLE XIII

| Rubber | Type of Surface | Stripping Force (g.) | | |
|---|---|---|---|---|
| | | No metal-organo solution added | With solution O | With solution P |
| Butyl | Glass | 52 | 194 | 550 |
| Do | Aluminum Foil | 214 | 354 | 803 |
| Do | Polyethylene | 128 | 334 | 546 |
| Styrene-Butadiene | Glass | 42 | | 1,120 |
| Do | Aluminum Foil | 19 | | 256 |
| Do | Polyvinylidene chloride (Saran) film | 43 | | 1,500 |
| Do | Polyethylene | 28 | | 896 |
| Do | Polyester (Mylar) film | 43 | | 330 |

The data clearly shows that addition of rosin modified docosanato chromic chloride, rosin modified octanato chromic chloride, and rosin modified linoleato chromic chloride all improve the adhesion of butyl rubber and butadiene rubber to cellulose. Self adhesion is improved drastically in the case of styrene-butadiene rubber. Bond strength to various surfaces other than cellulose is also greatly increased by the addition of the novel composition.

Example 33

A solution containing 25 g. gum rosin, 100 g. hexane and 10 g. isopropanol is made up and added to a butyl rubber-toluene solution prepared as described in Example 31 to give 2% rosin on rubber. The adhesive effect of this is then compared with a like solution to which organo-metal solution O (Example 31) has been added. Results are tabulated in Table XIV below.

TABLE XIV

| Solution | Bond to Parchment (g.) | Self Adhesion, (g.) | Lbs. coating per Ream |
|---|---|---|---|
| Pure Butyl Rubber | 155 | 675 | 6 |
| Butyl-Rosin | 385 | 950 | 8 |
| Butyl-Solution O | 620 | 765 | 11 |

These figures show that the rosin-docosanato chromic chloride isopropanol-hexane solution is considerably more effective than rosin in improving the bond of butyl rubber to cellulose.

scribed in Example 28. In the case of polymer solutions, e, f, g, h, and q the stripping force is then determined as described in Example 28. The results of these tests are tabulated in Table XV below.

TABLE XV

| Polymer | Organo-Metal Composition | Lbs. coating/Ream | Stripping Force (g.) | |
|---|---|---|---|---|
| | | | On parchment | Self Adhesion |
| e | None | 9 | 646 | 1,300 |
| e | P | 11 | 336 | 291 |
| e | O | 9 | 244 | 353 |
| e | Q | 8 | 38 | 64 |
| f | None | 6 | 838 | 1,020 |
| f | P | 7 | 765 | 1,150 |
| f | O | 3 | 565 | 630 |
| f | Q | 5 | 585 | 760 |
| g | None | 2 | 13 | 129 |
| g | P | 2 | 15 | 25 |
| g | O | 2 | 21 | 113 |
| g | Q | 2 | 15 | 100 |
| i | None | 11 | 35 | 580 |
| i | P | 9 | 610 | 665 |
| i | O | 8 | 480 | 630 |
| i | Q | 8 | 370 | 490 |
| h | None | 5 | 0 | 30 |
| h | P | 3 | 250 | 200 |
| h | O | 3 | 100 | 80 |
| h | Q | 2 | 100 | 100 |

In the case of polymer solutions j and o, a coated sheet of the parchment is bonded to an uncoated sheet and also to another similarly coated sheet by exposure to a temperature of 104° C. for 2 minutes using light contact pressure only, in a Williams sheet drier. The samples are then cooled and the stripping force (180° peelback) determined. The results are tabulated in Table XVI below.

TABLE XVI

| Polymer | Metal-Organo Composition | Lbs. coating/ Ream | Stripping Force (g.) | |
|---|---|---|---|---|
| | | | On Parchment | Self Adhesion |
| j | None | 18 | 476 | 900 |
| j | P | 23 | 465 | 1220 |
| j | O | 17 | 430 | 903 |
| j | Q | 24 | 655 | 1130 |
| o | None | 2 | 25 | 270 |
| o | P | 2 | 90 | 300 |
| o | O | 2 | 62 | 134 |
| o | Q | 3 | 45 | 200 |

In the case of polymer solutions k, l, and m the sheets of coated paper are wet with the solvent originally used to make the polymer solution, using a cotton swab. The wet sheets are applied either to a sheet of uncoated paper or to a sheet of coated paper which has not been rewet with solvent (self adhesion). Heat is then applied on a Williams sheet drier for 2 minutes at 104° C. with light pressure. Stripping force is measured as before. The results are given in Table XVII below.

TABLE XVII

| Polymer | Metal-Organo Composition | Lbs. coating/ Ream | Stripping Force (g.) | |
|---|---|---|---|---|
| | | | On Parchment | Self Adhesion |
| k | None | 5 | 86 | 72 |
| k | P | 7 | 74 | 95 |
| k | O | 5 | 34 | 108 |
| k | Q | 5 | 15 | 141 |
| l | None | 12 | 120 | 84 |
| l | P | 12 | 72 | 60 |
| l | O | 11 | 66 | 44 |
| l | Q | 11 | 66 | 44 |
| m | None | 15 | 95 | 250 |
| m | P | 15 | 55 | 115 |
| m | O | 18 | 75 | 105 |
| m | Q | 18 | 81 | 200 |

Example 35

A polybutadiene rubber solution is prepared by dissolving 60 g. "Cis-4" polybutadiene in 240 g. of toluene. To portions of this solution are added various portions of docosantato-chromic chloride-wood rosin-isopropanol composition in hexane prepared as in Example 8 and portions of a docosanato-chromic chloride-tall oil rosin-isopropanol composition in hexane prepared as in Example 10. The combined solutions are then applied to parchment and the stripping force for parchment and self adhesion measured as in Example 31. The results are tabulated in Table XVIII below.

TABLE XVIII

| Wood Rosin Composition | | | Tall Oil Rosin Composition | | |
|---|---|---|---|---|---|
| Concentration, Wt. percent | Stripping Force (g.) | | Concentration, wt. percent | Stripping Force (g.) | |
| | On Parchment | Self Adhesion | | On Parchment | Self Adhesion |
| 8.6 | 480 | 630 | 10.2 | 575 | 410 |
| 4.3 | 495 | 465 | 5.1 | 530 | 715 |
| 2.1 | 605 | 545 | 2.5 | 600 | 650 |
| 1.1 | 585 | 535 | 1.2 | 580 | 595 |
| 0.5 | 660 | 665 | 0.6 | | |

Example 36

Varying amounts of certain metal organo compositions prepared in preceding examples are added to portions of the polyisobutadiene solution whose preparation is described in Example 35. The stripping force to parchment and self adhesion are then determined as in Example 31. The results are reported in Table XIX below.

TABLE XIX

| Acid used in Metal-Organo Composition | Prep. of Composition described in Example | Wt. percent of Composition added | Coating, lbs./ Ream | Stripping Force (g.) | |
|---|---|---|---|---|---|
| | | | | On Parchment | Self Adhesion |
| Sorbic | 18 | 8.5 | 33 | 160 | 419 |
| Hydroxy stearic | 20 | 9.5 | 36 | 65 | 185 |
| Valeric | 21 | 9.8 | 33 | 255 | 200 |
| Isovaleric | 22 | 8.1 | 32 | 255 | 230 |
| Isodecanoic | 23 | 8.9 | 29 | 165 | 265 |
| Crotonic | 19 | 9.0 | 27 | 140 | 295 |
| Octanoic | 12 | 7.5 | 30 | 210 | 240 |

Example 37

The chromic chloride-rosin-isopropanol composition of Example 16 is added, in a proportion of 8%, to the butyl-rubber and butadiene-styrene rubber solutions of Example 31, to the polyisoprene (h) and polybutadiene (i) solutions of Example 27, the dimethylpolysiloxane (o) solution of Example 34 and to the cellulose acetate butyrate (l) and polystyrene (k) solutions of Example 28. The composite solutions are then applied to parchment as before and dried overnight. Stripping force with respect to uncoated parchment and self adhesion are then determined as in Examples 31. The results are given below in Table XX.

TABLE XX

| Polymer | Metal-Organo Composition added | Lbs. coating/ Ream | Stripping Force (g.) | |
|---|---|---|---|---|
| | | | On Parchment | Self Adhesion |
| Pure Butyl Rubber | No | 6 | 155 | 675 |
| | Yes | 15 | 600 | 690 |
| Styrene-Butadiene Rubber | No | 6 | 206 | 155 |
| | Yes | 14 | 220 | 40 |
| Polyisoprene | No | 5 | 0 | 30 |
| | Yes | 2 | 0 | 15 |
| Polybutadiene | No | 11 | 35 | 580 |
| | Yes | 14 | 165 | 265 |
| Cellulose-Acetate Butyrate | No | 12 | ¹120 | ¹80 |
| | Yes | 18 | ¹100 | ¹120 |
| Polystyrene | No | 5 | ¹90 | ¹75 |
| | Yes | 8 | ¹75 | ¹170 |
| Dimethylpolysiloxane | No | 2 | ²25 | ²305 |
| | Yes | 2 | ²25 | ²75 |

¹ Coating moistened with solvent and heat applied.
² Bonded with heat only.

Example 38

Experiments are conducted to ascertain the effect of direct addition of rosin modified compositions in suitable solvents to various pressure sensitive adhesives. The procedure is to weigh out 50 g. of the adhesive to be tested. To the adhesive, sufficient metal-organic composition is added to equal 2% metal-organo solids on dry adhesive solids. The adhesive mixtures are coated onto unbleached super-calendered vegetable parchment and allowed to air dry at room temperature for 24 hours. The amount of adhesive coating weight is determined by weighing the coated sheet and comparing it with the weight of an uncoated sheet of the same size.

In a first series of tests, one inch wide strip of coated parchment five inches long is laid on a sheet of unbleached super-calendered vegetable parchment and light finger pressure applied, just enough to insure contact between the surfaces. Within two minutes the stripping force required to separate the two surfaces in a 180 degree peelback is measured on a tensile tester.

In a second test series, two coated strips of the same size were laid face to face with the two coated surfaces contacting each other. Light finger pressure to insure good contact is applied. The stripping force in 180 degree peelback is determined within two minutes.

The testing temperature in both test series is 24° C. The adhesives used are Rubber and Asbestos Corporation's p561, described as a synthetic rubber-resin type, Rubber and Asbestos P538, a pigmented natural rubber type, and Rubber and Asbestos P578, a synthetic resin type.

The metal-organo compositions used are solutions O and P, i.e. the docosanato-chromic chloride-rosin-isopropanolhexane solution of Example 8 and the octanato-chromic chloride-isopropanol-hexane solution of Example 11.

The results for the compounded adhesive are reported in Table XXI is relative stripping force, i.e. percent of the value for the pure adhesive, at equal coating weight.

ene gradually dissolves to form a viscous solution. To fifty gram portions of this solution, various metal-organo compositions are added with agitation, making sure that the temperature is kept just below the boiling point of the toluene. Good compatibility is noted in all cases.

Two of the metal-organo compositions added are those designated earlier as solutions F and P. In addition to solutions F and P, solutions R, S, T, U, V. W and X are used.

Composition R is a sorbato-chromic chloride-isoamyl alcohol composition made by substituting isoamyl alcohol for the isopropanol and n-amyl alcohol of Example 18. Composition S is a docosanato-chromic chloride-rosin-isopropanol-hexane composition whose manufacture is described in Example 8. Composition T is similar to the crotonato-chromic chloride-gum rosin-isoamyl alcohol composition whose manufacture is described in Example 19, isoamylalcohol being substituted for isopropanol. Composition U is the amino-acetato-chromic chloride-rosin-isopropanol composition whose manufacture is described in Example 24. Composition V is the amino-acetato-chromium chloride-rosin-butanol composition of Example 25. Composition W is the 2-amino-octanato chromic chloride-rosin-n-butanol composition of Example 26. Composition X is the 12-hydroxy-stearato-chromic chloride-rosin-isopropanol-hexane composition of Example 20.

A piece of brown super-calendered vegetable parchment is placed on an electrically heated hot plate and a previously heated iron rod placed at one end. A portion of the test solution is poured out and the iron rod drawn down across the parchment to form a continuous film of

TABLE XXI

| Metal-Organo Comp. | Wt. Percent added | Adhesive | Relative Stripping Force (percent) | | Lbs. coating/ Ream |
|---|---|---|---|---|---|
| | | | On Parchment | Self Adhesion | |
| O | 8.6 | R & A p561 | 111 | 114 | |
| P | 10.2 | R & A p561 | 86 | 125 | 17 |
| O | 8.6 | R & A p578 | 143 | 143 | 11 |
| P | 10.2 | R & A p538 | 139 | 61 | 5 |

Example 39

Using the procedure outlined in Example 38, varying amounts of octanato chromic chloride-rosin-isopropanol-hexane composition (solution P) are added to separate 50 gram portions of Rubber and asbestos Corporation adhesive p578. The relative stripping force for self adhesion and bond to unbleached super-calendared vegetable parchment are determined. Results are given in Table XXII as follows:

TABLE XXII

| Conc. of Metal-Organo solids, percent by weight of adhesive solids | Relative Stripping Force (percent) | | Lbs. coating/ Ream |
|---|---|---|---|
| | On Parchment | Self Adhesion | |
| 1.3 | 138 | 148 | 11 |
| 2.5 | 125 | 150 | 13 |
| 5.1 | 138 | 176 | 11 |
| 10.2 | 143 | 143 | 11 |
| 20.4 | 150 | 158 | 8 |

These data show that 1.3% rosin modified octanato chomic chloride-isopropanol composition in hexane solution was sufficient to effect a marked improvement in the adhesiveness of Rubber and Asbestos p578 and that additional amounts, up to ten times as much, are of very little additional benefit.

Example 40

One hundred grams of medium density polyethylene (Monsanto MPE 2203) are mixed with four hundred grams of toluene, and the mixture is gradually heated, with considerable agitation, to just below the boiling point of toluene. Under these conditions, the polyethylcoating. The sheet is left on the hot plate until the solvent has evaporated and is then removed.

As a testing procedure, coated 1″ x 5″ strips are placed "face to face" and then heated for two minutes at 115° C., using light application pressure, just enough to keep the surface in firm contact. The strips are fused together by this procedure and are cooled and stripped in a tensile strength tester, using 180 degree peelback. This is recorded as "self adhesion." The same procedure is repeated, except that a strip of coated parchment is placed in contact with a strip of plain super-calendered unbleached vegetable parchment. Results are reported as "bond to parchment." Parchment is used as the test medium because the poor adhesion of polyethylene for this surface is well known.

The results are given in Table XXIII as follows:

TABLE XXIII

| Metal-Organo Composition | Percent Added | Stripping Force (g.) | |
|---|---|---|---|
| | | Self Adhesion | On Parchment |
| None | | 130 | 20 |
| F | 8.5 | 120 | 60 |
| R | 11.2 | 185 | 125 |
| T | 9.0 | 450 | 70 |
| U | 9.0 | 320 | 60 |
| V | 6.4 | 205 | 25 |
| P | 8.5 | 250 | 20 |

These data clearly show that addition of certain chromium complexes to polyethylene affects its ability to adhere to cellulose and to itself.

The following examples disclose incorporating chromium complexes of the invention in various high molecular weight organic materials to modify the surface characteristics of these materials. The ability of various adhesives to adhere to these modified organic materials is described.

EXAMPLE 41

1″ x 5″ strips of pressure sensitive adhesive tape (Minnesota Mining and Mfg. Co. No. 202) are applied, under a pressure of 400 p.s.i. for 2 minutes at room temperature, to modified polyethylene coated brown super-calendared vegetable parchment. The vegetable parchment sheets are coated with certain modified polyethylene solutions according to the procedure described in Example 40. The polyethylene solution used for coating is described in Example 40 and is modified by the addition of metal-organo compositions F, T, W and X.

The stripping force required to strip the tape from the modified polyethylene at 180 degree peelback is measured in a standard tensile tester. The results are tabulated below:

TABLE XXIV

| Metal-Organo Composition | Wt. Percent Composition | Stripping Force on Parchment (g.) |
|---|---|---|
| None | | 260 |
| F | 8.5 | 265 |
| T | 9.0 | 355 |
| W | 6.4 | 520 |
| X | 9.5 | 135 |

EXAMPLE 42

Pieces of brown super-calendared vegetable parchment are coated with solutions of polyethylene containing metal-organo compositions, S, T and W, according to the procedure described in Example 40.

The modified polyethylene films on parchment are then coated with certain polymer compositions including polymer solution b, and a 22.2% by weight, solution of styrene-butadiene (Ameripol 1500) in toluene, hereafter designated as polymer solution q. The polymer compositions are coated over various modified polyethylene surfaces and the coating is allowed to dry for a period ranging from three to four days at room temperature. Two inch wide strips of the coated parchment are laid face to face with the coated surfaces contacting each other. A pressure of 400 p.s.i. is then applied to the strips at room temperature for two minutes. The stripping force required to separate the polymer composition from the modified polyethylene in a 180° peelback is measured in a tensile tester. The results are tabulated below:

TABLE XXV

| Polymer coated on Polyethylene | Metal-organo Composition Added to Polyethylene [1] | Adhesion of Polymer to Polyethylene (g./inch) |
|---|---|---|
| b | None | 12 |
| b | T | 138 |
| b | W | 92 |
| b | S | 238 |
| q | None | 244 |
| q | S | 675 |

[1] 8% by weight complex on polyethylene solids.

EXAMPLE 43

A mixture of polyvinyl chloride (B. F. Goodrich Geon 101) and dioctyl phthalate plasticizer (B. F. Goodrich G P 261) is prepared by dispersing 240 grams of polyvinyl chloride in a solution comprising 160 grams of the plasticizer and 10 grams of hexane. To this dispersion 8% by weight, based on plastisol solids, of metal-organo compositions L, S, T, V, W and octanato chromic chloride-rosin-isopropanol-n-hexanol, hereafter designated Y, prepared according to the procedure described in Example 11 except that n-hexanol is substituted for hexane, are added.

The dispersions are then coated on Kraft paper and fused for two minutes at 193° C. The modified polyvinyl chloride film on Kraft paper is then coated with certain polymer compositions including polymer solutions b and q. The polymer compositions are coated over the various modified surfaces and the coating is allowed to air-dry for a period ranging from three to four days at room temperature. One inch wide strips of the coated paper are cut and the two polymer surfaces brought into contact. A pressure of 400 p.s.i. is then applied to the strips at room temperature for two minutes. The stripping force required to separate the polymer composition from the modified polyvinyl chloride in a 180° peelback is measured in a tensile tester. The results are tabulated below:

TABLE XXVI

| Polymer Coated On Polyvinyl Chloride | Metal-organo Composition Added to Polyvinyl Chloride [1] | Adhesion of Polymer to Polyvinyl Chloride (g./inch) |
|---|---|---|
| b | None | 250 |
| b | V | 1,012 |
| b | Y | 606 |
| b | L | 650 |
| b | S | 635 |
| q | None | 150 |
| q | V | 2,100 |
| q | X | 2,100 |
| q | T | 1,625 |
| q | W | 1,317 |
| q | Y | 1,200 |

[1] 8% complex on plastisol solids.

The results set forth in Examples 40 to 43 show that the addition of the metal-organo compositions of the invention to various high molecular weight organic materials such as polyvinyl chloride, modifies certain properties of these organic materials significantly. For example, the ability of other substances, including pressure sensitive adhesives and polymeric materials such as various rubber compositions to adhere to metal-organo modified polymer films is illustrated.

Considerable modification is possible in the variation of details in practicing the present invention without departing from the scope thereof.

I claim:
1. The method for producing a water insoluble organo-chromium complex which comprises heating at a temperature of at least 80° C. for at least 15 minutes:
   (i) 1 to 10 parts by weight of a fused chromium-monocarboxylic organic acid coordination compound prepared by melting together a trivalent chromium salt and a monocarboxylic organic acid having from 2 to 22 carbon atoms, with
   (ii) 0.1 to 1000 parts by weight of an alcohol selected from the group consisting of:
      (a) n-butanol and
      (b) aliphatic alcohols having from 5 to 18 carbon atoms

2. The method of claim 1 wherein said chromium-monocarboxylic acid coordination compound is refluxed with said aliphatic alcohol; wherein said monocarboxylic acid is selected from the group consisting of butyric, valeric, isovaleric, caproic, octanoic, undecanoic, isodecanoic, lauric, myristic, palmitic, stearic, arachidic, docosanoic, $\alpha$-methyl caproic, $\alpha$-octyl caproic, $\beta$-ethyl stearic, methacrylic, crotonic, sorbic, linoleic, geranic, oleic, palmitolic, eiconsinic, aminoacetic, 2-aminooctanoic, $\alpha$-chlorovaleric, $\beta,\beta$-dibromocaproic, $\beta$-hydroxy pelargonic, $\alpha$-amino undecanoic and 12-hydroxy stearic acids; and wherein said aliphatic alcohol is selected from the group consisting of n-butyl alcohol, n-amyl alcohol, n-hexyl alcohol, cetyl alcohol, stearyl alcohol, oleyl alcohol, iso-octyl alcohol, 3-isopropyl-4-methyl-3-hexanol, 3-methyl-3-butyn-2-ol, 1-penten-3-ol, 4-penten-3-ol, 5-hexen-3-ol and pinacol.

3. The water insoluble, organo-chromium complex produced by the process of claim 1.

4. The method for producing a water insoluble organo-chromium complex which comprises heating at a temperature of at least 80° C. for at least 15 minutes:
   (i) 1 to 10 parts by weight of a fused chromium-monocarboxylic organic acid coordination compound prepared by melting together:
      (a) a trivalent chromium salt,
      (b) rosin, and
      (c) a monocarboxylic organic acid having from 2 to 22 carbon atoms selected from the group consisting of:
  (1) saturated straight chain acids,
  (2) saturated branched chain acids,
  (3) unsaturated straight chain acids,
  (4) unsaturated branched chain acids, and
  (5) aliphatic acids containing functional groups in addition to the carboxylic group,
with,
  (ii) 0.1 to 1000 parts by weight of an alcohol selected from the group consisting of:
    (a) n-butanol and
    (b) aliphatic alcohols having from 5 to 18 carbon atoms.

5. The method of claim 4 wherein said chromium-monocarboxylic acid-rosin coordination compound is refluxed with said aliphatic alcohol; wherein said monocarboxylic acid is selected from the group consisting of butyric, valeric, isovaleric, caproic, octanoic, undecanoic, isodecanoic, lauric, myristic, palmitic, stearic, arachidic, methacrylic, crotonic, sorbic, linoleic, geranic, oleic, palmitolic, eicosonic, aminoacetic, 2-aminooctanoic, α-chlorovaleric, β,β-dibromocaproic, β-hydroxy pelargonic, α-amino undecanoic and 12-hydroxy stearic acids; and wherein said alcohol is selected from the group consisting of n-butyl alcohol, n-amyl alcohol, n-hexyl alcohol, cetyl alcohol, stearyl alcohol, oleyl alcohol, isooctyl alcohol, 3-isopropyl-4-methyl-3-hexanol, 3-methyl-3-butyn-2-ol, 1-penten-3-ol, 4-penten-3-ol, 5-hexen-3-ol and pinacol.

6. The water insoluble, organo-chromium complex produced by the process of claim 4.

7. The method for producing a water insoluble organo-chromium complex which comprises heating at a temperature of at least 80° C. for at least 15 minutes:
  (i) 1 to 10 parts by weight of a fused chromium-monocarboxylic organic acid coordination compound prepared by melting together a trivalent chromium salt and a monocarboxylic organic acid having from 2 to 22 carbon atoms selected from the group consisting of:
    (a) saturated straight chain acids,
    (b) saturated branched chain acids,
    (c) unsaturated straight chain acids,
    (d) unsaturated branched chain acids, and
    (e) aliphatic acids containing functional groups in addition to the carboxylic group,
with
  (ii) rosin and
  (iii) from 0.1 to 1000 parts of an alcohol selected from the group consisting of:
    (a) n-butanol and
    (b) aliphatic alcohols having from 5 to 18 carbon atoms.

8. The method of claim 7 wherein said fused chromium-monocarboxylic acid coordination compound is refluxed with said rosin and said aliphatic alcohol; wherein said monocarboxylic acid is selected from the group consisting of butyric, valeric, isovaleric, caproic, octanoic, undecanoic, isodecanoic, lauric, myristic, palmitic, stearic, arachidic, methacrylic crotonic, sorbic, linoleic, geranic, oleic, palmitolic eicosonic, aminoacetic, 2-aminooctanoic, α-chlorovaleric, β-β-dibromocaproic, β-hydroxy pelargonic, α-amino undecanoic and 12-hydroxy stearic acids; and wherein said alcohol is selected from the group consisting of n-butyl alcohol, n-amyl alcohol, n-hexyl alcohol, cetyl alcohol, stearyl alcohol, oleyl alcohol, isooctyl alcohol, 3-isopropy-4-methyl-3-hexanol, 3-methyl-3-butyn-2-ol, 1-penten-3-ol, 4-penten-3-ol, 5-hexen-3-ol and pinacol.

9. The water insoluble, organo-chromium complex produced by the process of claim 7.

References Cited
UNITED STATES PATENTS

| | | | |
|---|---|---|---|
| 3,248,215 | 11/1966 | Bartz | 106—13 |
| 2,273,040 | 2/1942 | Iler | 91—68 |
| 2,356,161 | 8/1944 | Iler | 260—97 |
| 2,524,803 | 10/1950 | Iler | 23—87 |
| 2,683,156 | 7/1954 | Iler | 260—438.5 |
| 3,194,823 | 7/1965 | Le Seur et al. | 260—414 |
| 3,256,266 | 6/1966 | Burt | 260—97.5 |
| 2,681,922 | 6/1954 | Balthis | 106—178 |
| 2,809,121 | 10/1957 | Davis et al. | 106—178 |

DONALD E. CZAJA, *Primary Examiner.*

ALEXANDER H. BRODMERKEL, LEON J. BERCOVITZ, *Examiners.*

J. H. WOO, F. McKELVEY, *Assistant Examiners.*